Sept. 26, 1961          C. A. CADY          3,002,105

EMERGENCY POWER SUPPLY

Filed Aug. 20, 1959          3 Sheets—Sheet 1

*INVENTOR.*
CHARLES A. CADY
BY KENWAY, JENNEY, WITTER & HILDRETH

ATTORNEYS

Sept. 26, 1961   C. A. CADY   3,002,105
EMERGENCY POWER SUPPLY
Filed Aug. 20, 1959   3 Sheets-Sheet 2
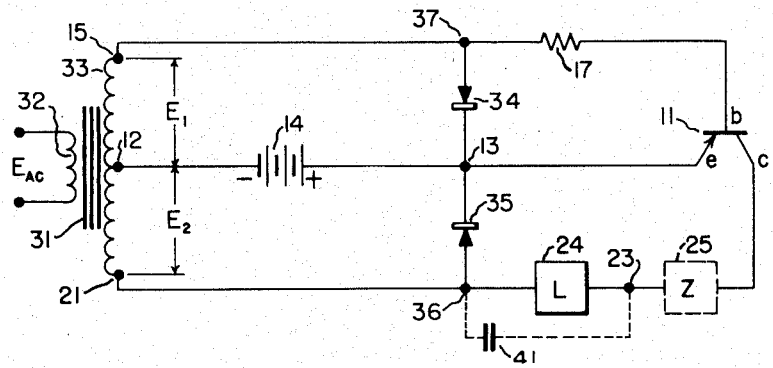
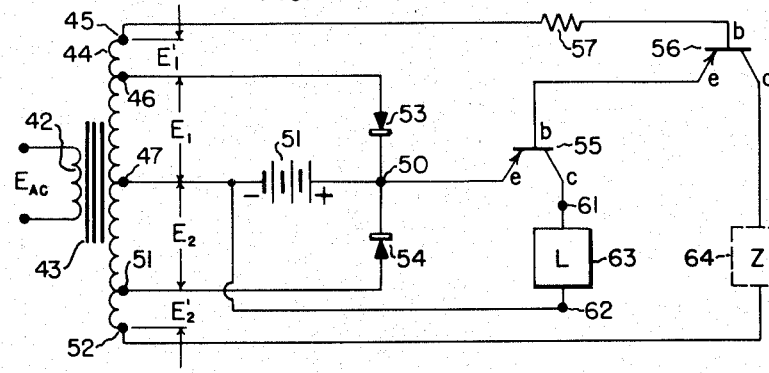
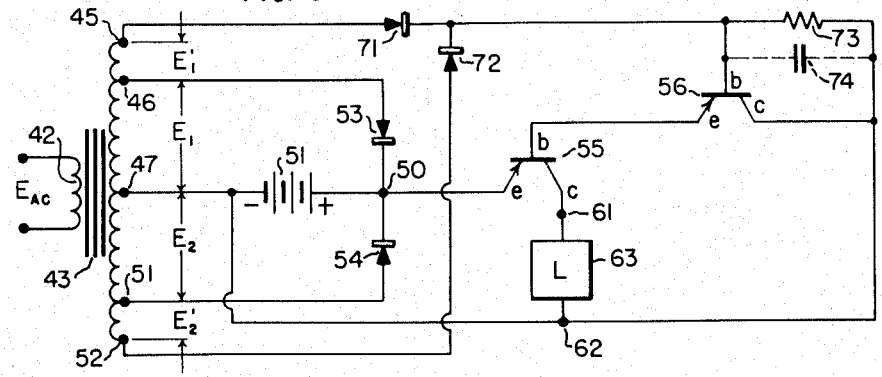
INVENTOR.
CHARLES A. CADY
BY KENWAY, JENNEY, WITTER & HILDRETH
ATTORNEYS

INVENTOR.
CHARLES A. CADY
BY KENWAY, JENNEY, WITTER & HILDRETH
ATTORNEYS

United States Patent Office 3,002,105
Patented Sept. 26, 1961

3,002,105
EMERGENCY POWER SUPPLY
Charles A. Cady, Shaw Drive, Wayland, Mass.
Filed Aug. 20, 1959, Ser. No. 835,109
10 Claims. (Cl. 307—64)

The present invention relates in general to new and improved emergency power supplies, in particular power supplies which operate automatically upon the failure of the normal source of power.

There are many cases where the failure of the normal power source makes it necessary to provide an auxiliary or emergency source, such as a local battery, which may be switched into operation upon the failure of the normal power source. Such a battery may be used directly to take over the function of the normal power source, or it may be used to energize an oscillator which, in turn, supplies the power, Alternatively, the battery may be used to actuate further control circuits which are responsive to the battery power, such as the starting motor of auxiliary power generating equipment.

Prior art emergency power supplies and their related control equipment generally employ electro-mechanical devices of the relay type to obtain the desired control function. These relay systems possess many undesirable characteristics which tend to limit their length of service as well as their reliability. The dependence upon moving parts is the primary factor affecting reliability. Additionally, relays must be protected from their environment since they are sensitive to shock, heat, moisture, dirt, fungus, etc. While the cost of the individual relay is relatively high, the per unit cost is greatly increased as a result of the required maintenance and replacement.

In comparison to a relay, a transistor, which may be employed as a switch, has no moving parts that are subject to wear to decrease its life or affect its reliability. Although large temperature variations may affect the operations of a transistor, it is relatively immune to environmental conditions due to the fact that it does not have the exposed contacts found in an ordinary relay.

Accordingly, it is the primary object of this invention to provide automatic emergency power supplies which avoid the use of moving parts by employing switching transistors in order to supply emergency power to a load upon the failure of normal power. This and other objects of the invention, together with the features and advantages thereof, will become apparent when read in conjunction with the accompanying drawings in which:

FIG. 6 illustrates an embodiment of the invention which is adapted to recharge the emergency power source from the normal power source;

FIG. 7 illustrates an embodiment of the invention for supplying D.C. emergency power which employs two transistors in order to increase the sensitivity and reliability of control;

FIG. 8 illustrates an embodiment of the invention for supplying D.C. emergency power wherein the two transistors are energized by D.C. voltages derived from the normal A.C. power source;

The heart of the invention consists of a transistor whose emitter-collector circuit contains an emergency D.C. power source, as well as the load which is to be energized upon the failure of normal external A.C. power. A pair of A.C. signals which are 180° out of phase with each other and which are derived from the A.C. power source are applied to the transistor so as to maintain it in the cut off condition despite the application of the proper D.C. potentials from the D.C. power source. Upon failure of the A.C. power, the A.C. signals are no longer applied and the D.C. power source is controlling. The transistor conducts and the load is energized by the D.C. power source either directly or from a self-oscillating converter which is energized by the D.C. power source. Upon the reappearance of the A.C. signals the transistor again reverts to its cut off condition.

Figure 1:
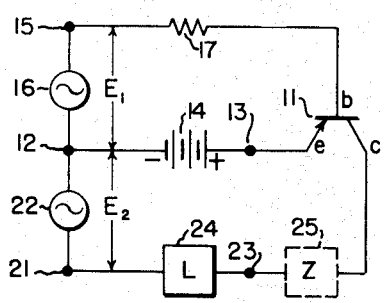
FIG. 1 illustrates a first embodiment of the invention for supplying D.C. emergency power to a load.

With reference now to FIG. 1, a transistor 11 is seen to comprise an emitter, a base, and a collector which are designated by their corresponding initials. The emitter-base circuit comprises a pair of terminals 12 and 13 between which an emergency power source 14 is connected. In the instant embodiment, the emergency power source comprises a D.C. battery whose positive electrode is connected to terminal 13 and whose negative electrode is connected to terminal 12. An A.C. source 16 is connected between terminal 12 and a terminal 15 in the emitter-base circuit and forms a D.C. path. The A.C. voltage $E_1$, applied by source 16, is derived from the normal A.C. power source, failure of which brings the apparatus of the instant invention into operation. The A.C. voltage $E_1$ has an amplitude which exceeds the D.C. potential applied between terminals 12 and 13 by battery 14. Terminal 15 is coupled to the base of transistor 11 by means of a resistive impedance 17 which may be separately connected into the emitter-base circuit. Alternatively, impedance 17 may comprise the internal resistance of source 16 and/or the internal transistor base resistance. The emitter-collector circuit includes the aforesaid terminals 12 and 13, between which the D.C. power source 14 is connected, as well as a terminal 21. A second A.C. power source 22 which also forms a D.C. path, is connected between terminals 12 and 21 in order to apply an A.C. voltage $E_2$ between them. The latter A.C. voltage is also derived from the normal A.C. power source. Hence, it is of the same frequency at A.C. voltage $E_1$ but if of opposite phase, and the amplitude of A.C. voltage $E_2$ also exceeds the D.C. potential applied by source 14, but is not necessarily of the same amplitude as $E_1$. The emitter-collector circuit further includes a terminal 23, and a load 24 which is connected between terminals 21 and 23. Terminal 23 is either directly connected to the collector of transistor 11, or is coupled thereto by means of an inductive impedance 25 to prevent circuit oscillations.

As shown in FIG. 1, transistor 11 is of the pnp type. It will be readily apparent that transistors of the npn type may also be used provided that the polarities of battery 14 are reversed. Similarly, pnpn or tetrode transistors may be employed. In the latter case, a second base connection is necessary which, however, affects only the internal characteristics of the transistor and does not change the basic operation of the circuit of FIG. 1.

In general, a transistor will have emitter-to-collector current when the proper potential is applied between emitter and base and between emitter and collector respectively. For the circuit shown in FIG. 1, battery 14 is poled to apply the proper potentials to pnp transistor 11, provided the A.C. voltages $E_1$ and $E_2$ are not applied, and sources 16 and 22 respectively provide a D.C. path. In the latter case, current flows between the emitter and the collector. Accordingly, the load 24, which is connected in series in the emitter-collector circuit, is energized. When the emitter-to-collector junction is "reverse" polarized, no current flows across this junction and hence load 24 is not energized. The latter situation is true for pnp transistor 11 when the potential applied to the collector is positive with respect to that of the emitter. Similarly, if the emitter-to-base junction is "reverse" polarized, no emitter-to-base current can flow. As a consequence, normal collector current cannot flow in the emitter-to-collector junction regardless of the D.C. potential applied between these electrodes.

In operation, transistor 11 acts as a switch for the emitter-collector circuit which includes load 24, the switching action being controlled by A.C. voltages $E_1$ and $E_2$. When $E_1$ and $E_2$ are at or near 0 the applied potential of D.C. battery 14 is controlling and a current flows from the battery, across the emitter-to-base junction of transistor 11, through resistive impedance 17 and back to the battery by way of the D.C. path provided by source 16. A second current which is approximately $\beta$ times as large as the first current, flows from the battery across the emitter-to-collector junction of the transistor, through inductive impedance 25 (if any), through load 24 and back to the battery by way of the conductive path provided by A.C. source 22. As a result, load 24 is energized as long as current is supplied to it from the battery.

Figure 2:
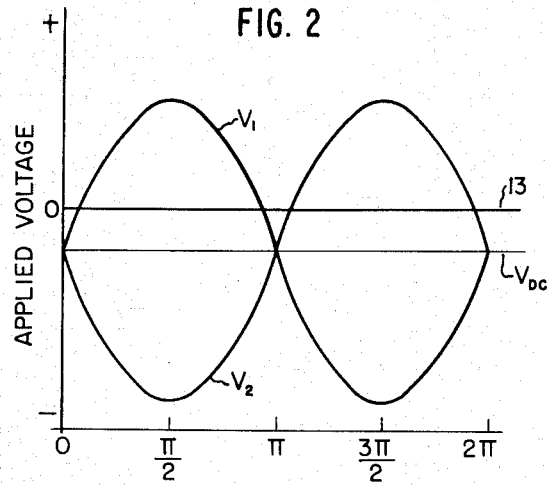
FIG. 2 illustrates the time relationship of the divers applied voltages.

When $E_1$ and $E_2$ are present as A.C. voltages of the same frequency but of opposite phase, substantially no current can flow in the emitter-collector circuit and load 24 remains unenergized. This operation will be more readily understood with reference to FIG. 1 wherein the reference line labeled 13 represents the potential of emitter terminal 13 and all other voltages are represented with respect to terminal 13. The D.C. potential line $V_{DC}$ represents the D.C. potential applied to terminal 12 by battery 14. $V_1$ represents the A.C. voltage applied to the base of the transistor and $V_2$ represents the A.C. voltage applied to the transistor collector. At the $\pi/2$ point of the cycle, the voltage applied between the emitter and base of the transistor is represented by the vector addition of the battery voltage and $V_1$, i.e. $V_1-V_{DC}$. Provided $V_1$ is equal to or greater than $V_{DC}$ (as shown in FIG. 2), the emitter-to-base junction of the transistor has either 0 or a "reverse" bias applied thereto which prevents current flow in the emitter-base circuit. Simultaneously, voltage $V_2$ which is 180° out of phase with $V_1$ is applied, the vector sum of $-V_1$ and $-V_{DC}$ being applied to the emitter-to-collector junction. Although the emitter-to-collector junction has the proper voltage applied to it for current flow, the absence of emitter-to-base current prevents current in the emitter-collector circuit and load 24, which is in the emitter-collector circuit, remains unenergized. At point $\pi$, both $V_1$ and $V_2$ are 0 and the applied battery voltages permits current flow across the emitter-to-collector junction. However, the time interval during which this condition obtains is sufficiently small so that substantially no current flows in the emitter-collector circuit and load 24 again remains unenergized. At point $3\pi/2$, the vector addition of voltage $V_1$ and $V_{DC}$ applies a negative potential across the emitter-to-base junction to permit current flow in the emitter-base circuit. Provided $V_2$ is equal to or greater than $V_{DC}$, the emitter-to-collector junction is simultaneously "reverse" biased to prevent current flow in the emitter-tocollector circuit. Accordingly, as long as A.C. voltages $E_1$ and $E_2$ are present, load 24 remains unenergized. Failure of the normal A.C. power source removes $E_1$ and $E_2$ and the transistor becomes conductive. Battery current then flows in the emitter-collector circuit and the load is energized.

Figure 3:
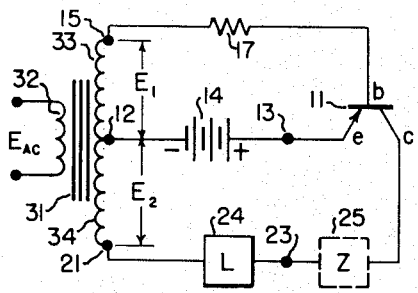
FIG. 3 illustrates a modification of the apparatus of FIG. 1.

FIG. 3 illustrates a modification of the embodiment shown in FIG. 1, to which the same reference numerals have been applied. Instead of the separate A.C. power sources 16 and 22, a single transformer 31 is used and a voltage $E_{AC}$ is applied to the terminals of primary 32. Terminal 12 may or may not be placed at the center of transformer secondary 33 provided only that A.C. voltages $E_1$ and $E_2$, which are derived between terminals 12—15 and 12—21 respectively, are 180° out of phase with each other and exceed the battery voltage $V_{DC}$. If desired, an inductive impedance 25 may again be included in series with the transistor collector in order to prevent oscillations.

Figure 4:
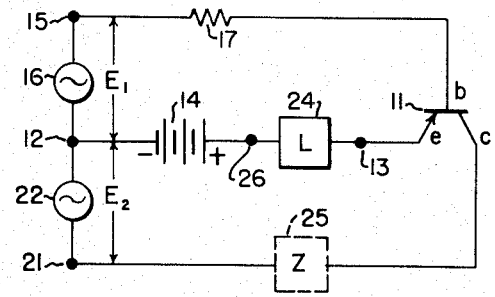
FIG. 4 illustrates an embodiment of the invention for supplying D.C. emergency power wherein an improved efficiency is obtained.

FIG. 4 illustrates another embodiment of the invention, to which the same reference numerals have again been applied. In the instant embodiment, the load is no longer connected between terminals 23 and 21 as in FIG. 1, but is connected directly between terminals 26 and 13, intermediate D.C. source 14 and the transistor emitter. As a result, in the absence of A.C. voltages $E_1$ and $E_2$, load 24 is energized by the current flowing in the emitter-base circuit as well as by the current flowing in the emitter-collector circuit. Since both of these currents are adapted to perform useful work in the load, the over-all efficiency of the circuit is increased.

Figure 5:
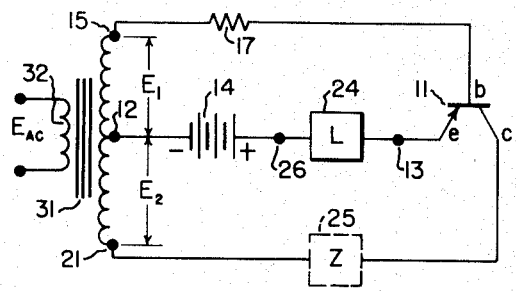
FIG. 5 illustrates a modification of the apparatus of FIG. 4.

FIG. 5 illustrates a modification of the apparatus of FIG. 4, similar to the modification of FIG. 3. The separate A.C. sources 16 and 22 are replaced by transformer 31 and a single A.C. voltage $E_{AC}$ is applied to the terminals of primary 32. The A.C. voltages $E_1$ and $E_2$ appearing between terminals 12—15 and 12—21 respectively, serve to operate this circuit in the same manner as the circuit of FIG. 4.

FIG. 6 illustrates a further embodiment of the invention to which the same reference numerals have again been applied. The D.C. power source 14 comprises a storage battery adapted to be charged through a full-wave rectifier from the A.C. input. The full-wave rectifier comprises a pair of oppositely poled rectifiers 34 and 35, connected between terminals 13 and 37 and between terminals 13 and 36 respectively. When A.C. voltages $E_1$ and $E_2$ are present, no current flows in the emitter-collector circuit of the transistor and hence, load 24 is not energized. During this interval the full-wave, center-tapped rectifier system consisting of rectifiers 34 and 35, applies D.C. power to storage battery 14 to recharge the latter. If desired, condenser 41 may be connected across the terminals 23 and 36 in order to filter out A.C. ripples. In the event of power failure of the A.C. power source, which causes the A.C. voltages $E_1$ and $E_2$ to be absent, the circuit operates as explained in connection with the apparatus of FIG. 1 wherein the D.C. power source 14 energizes the load 24. It will be readily understood that where an npn transistor is used in place of the pnp transistor 11 shown in the drawing, the polarities of rectifiers 34 and 35 respectively, as well as the polarities of the applied voltages, will be reversed. As in the embodiments of FIGS. 1 and 2 through 5, A.C. voltages $E_1$ and $E_2$ need not have the same amplitude provided only that they are equal to or larger than the D.C. voltage applied by storage battery 14.

FIG. 7 illustrates an embodiment of the invention wherein the sensitivity is increased by the use of an additional high gain transistor which controls the operation of the power transistor. An A.C. voltage $E_{AC}$ is applied to the terminals of primary winding 42 of transformer 43. The transformer secondary 44, provides a pair of oppositely phased A.C. voltages $E_1$ and $E_2$ between terminals 47 and 46 and terminals 47 and 51 respectively. The position of terminal 47 on the secondary winding determines the relative amplitudes of A.C. voltages $E_1$ and $E_2$. A storage battery 51 is connected intermediate terminals 47 and 50 and is adapted to be charged from the normal A.C. power source through a full-wave center-tapped rectifier consisting of oppositely poled rectifiers 53 and 54 connected between terminals 50 and 46 and terminals 50 and 51 respectively. Terminal 50 is connected to the emitter of a high-power transistor 55 whose emitter, base, and collector respectively are designated by the appropriate initials. A pair of terminals 61 and 62 is connected in series with the collector of transistor 55 and is adapted to have a load 63 connected between them. Terminal 62 is tied to terminal 47 by means of an appropriate connection. A high-gain transistor 56 has its base coupled to terminal 45 of the transformer secondary by way of an effective resistive impedance 57. The emitter of transistor 56 is connected directly to the base of transistor 55. The collector of transistor 56 is coupled to terminal 52 of the transformer secondary. If desired, an inductive impedance 64 is connected in series with the collector of transistor 56 in order to prevent oscillations in the circuit. The terminals 45 and 52 respectively need not be positioned as shown on the transformer secondary 44. For example, terminal 45 may be coincident with terminal 46 or it may be located on the transformer secondary intermediate terminals 47 and 46. Similarly, terminal 52 may be coincident with terminal 51 or it may be located intermediate terminals 47 and 51. Accordingly, the voltages coupled to the base and the collector respectively of transistor 56 may be $E_1 \pm E_1'$ and $E_2 \pm E_2'$ respectively.

While high-gain transistor 56 is operated by the foregoing voltages in a manner explained above in connection with the embodiment illustrated in FIG. 1, the operation of high-power transistor 55 is governed by the current flow across its emitter-to-base junction. As long as A.C. voltages are applied to the base and collector of transistor 56, no current can flow across its emitter-to-collector junction. Depending on the particular portion of the cycle of the applied A.C. voltage $E_1 \pm E_1'$, the voltage applied between emitter and collector may constitute a "reverse" bias which prevents current flow directly. In the second half of the cycle, a reverse bias is applied across the emitter-to-base junction of transistor 56 which prevents current flow across that junction and hence in the emitter-collector circuit. In either case, current flow across the emitter-to-collector junction of transistor 56 is substantially suppressed. As a result, the only current which can flow is the relatively small emitter-to-base current which flows during the half cycle when the applied voltage is plus $E_1 \pm E_1'$. This current, however, although it must flow across the emitter-to-base junction of transistor 55, is insufficient to bring about current flow across the emitter-to-collector junction of the latter transistor. As a result, load 63, which is connected in the emitter-collector circuit of transistor 55, remains unenergized. In the event of failure of the A.C. power source, no A.C. voltages are derived from the transformer secondary. In this case, transistor 56 is properly biased by the D.C. voltages applied from storage battery 51 via the transformer secondary which comprises a D.C. path. As a result, current flow is provided in the emitter-base circuit of transistor 56 which causes current flow in the emitter-collector circuit of the same transistor. The amplitude of the current in the latter circuit is relatively high owing to the high-gain characteristic of transistor 56. Since both of the foregoing currents pass the emitter of transistor 56, they also flow across the emitter-to-base junction of transistor 55. This, in turn, gives rise to a large emitter-to-collector current in transistor 55 which is used to energize load 63.

The advantage of the embodiment of the invention illustrated in FIG. 7, resides in the fact that a more complete current cut-off may be obtained in the emitter-collector circuit of transistor 55. Additionally, greater variations in collector cut-off characteristics of transistor 55 can be tolerated between individual transistors. Similarly, the variation of the cut-off characteristic of transistor 55, due to changes of the ambient temperature, can be tolerated to a much greater extent. It will also be noted that load 63, instead of being returned to the terminal 52 of the transformer secondary, is now returned to terminal 47. As a result only a low current D.C. path through the transformer secondary is required between terminals 47—45 and 47—52 in order to apply D.C. voltages to the high-gain transistor 56. More significantly, during the time that load 63 is energized, no substantial D.C. power loss occurs in the transformer secondary windings, since the emitter-collector circuit of transistor 55 is entirely independent of the transformer secondary. Accordingly, the size of transformer 43 may be limited since it is required only to charge battery 51 by way of the full-wave rectifier. The latter operation may require only a few amperes of current as compared to the full D.C. load current flowing in the emitter-collector circuit of transistor 55.

As previously explained, the amplitude of voltages $E_1$ and $E_2$ may vary, depending only on the position of terminal 47 on the transformer secondary. Similarly, where npn junction transistors are used in place of the pnp transistors illustrated, the polarity of storage battery 51, as well as the polarities of rectifiers 53 and 54, have to be reversed.

FIG. 8 illustrates a further embodiment of the invention which improves over the performance of the apparatus shown in FIG. 7 by operating the high-gain transistor which controls the power transistor with D.C. potentials. Wherever applicable, the reference numerals of FIG. 7 have been retained. As in the case of FIG. 7, the voltage which appears on transformer secondary terminals 45 and 52 is $E_1 \pm E_1'$ and $E_2 \pm E_2'$ respectively, depending on the location of these terminals with respect to 46 and 51 respectively. These A.C. voltages, instead of being applied directly to high-gain transistor 56, are applied to a full-wave rectifier comprising oppositely poled rectifiers 71 and 72 connected to the base of transistor 56. Whenever the foregoing A.C. voltages are present, the action of rectifiers 71 and 72 provides a D.C. output voltage which appears across resistor 73. If desired, a capacitor 74 may be connected across resistor 73 in order to eliminate power supply ripple components. When the D.C. voltage appearing across resistor 73 is sufficient to oppose the voltage between the emitter and base of transistor 56 so as to reduce the emitter-to-base current substantially to zero, transistor 56 is in the cut-off state and no emitter-to-collector current can flow. Owing to the absence of emitter current in transistor 56, there is no current flow across the emitter-to-base junction of transistor 55 to which it is connected. As a result, transistor 55 is also in the state of emitter-to-collector current cut-off and load 63 remains unenergized. During normal A.C. power supply failure, $E_{AC}$ is absent, as are the voltages appearing on the transformer secondary terminals. Rectifier elements 71 and 72 consequently become non-conductive and the D.C. voltage across resistor 73 drops to a very low value. Under these conditions, the bias applied between emitter and base of transistor 56 by storage battery 51 produces current flow across the emitter-to-base junction. This current, in turn, causes a larger current to flow in the emitter-collector circuit of transistor 56, the amplitude of the last-recited current depending on the gain of transistor 56. As in the case of FIG. 7, the combined current determines the emitter-to-base current flow of transistor 55 which, in turn, causes a large-emitter-to-collector current to flow in transistor 55. Accordingly, current flows in the emitter-collector current which energizes the load.

One of the important advantages of the embodiment of the invention illustrated in FIG. 8, derives from the fact that no ripple current, which may be the result of leakage currents through transistors 55 and 56, can flow to the load when A.C. voltages are applied. A second advantage derives from the fact that the points at which the load is energized and de-energized respectively can be more accurately controlled than was the case for the apparatus of FIG. 7. Further advantages derived from the fact that the circuit illustrated in FIG. 8 is not subject to transistor damage resulting from transient A.C. line voltage surges. In the past, it has been found that such voltage surges may contribute to shorten the life of the transistor. These transient effects are generally enhanced by the inductive nature of the transformer. In addition to the action of the full-wave rectifier comprising rectifier elements 71 and 72, which prevent these line surges from reaching the transistor, the filtering action of condenser 74 aids in smoothing out these line transients. In the apparatus of FIG. 8 oscillation is no longer a problem. Accordingly, an inductive impedance to suppress oscillations is not required.

Figure 9:
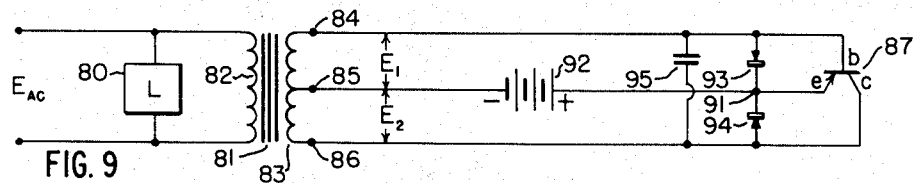
FIG. 9 illustrates an embodiment of the invention which employs an oscillating circuit converter which is powered from the D.C. source and supplies emergency A.C. power to the load upon the failure of the normal A.C. power source.

FIG. 9 illustrates an embodiment of the invention wherein a D.C. source is used to power an oscillator converter circuit in order to supply A.C. emergency power to the same load which is ordinarily energized by the normal A.C. power supply. In the illustrated circuit the voltage $E_{AC}$ is applied directly to the load 80 although, of course, the load need not be connected in this precise manner. For example, the load could be energized with only a portion of the voltage of source $E_{AC}$ or, indeed, it could be connected in series with the source. A power transformer 81 has its primary winding 82 connected across the source $E_{AC}$ while the secondary winding 83 comprises three terminals 84, 85, and 86 respectively. The terminal 85 need not be a center tap provided only that the two voltages $E_1$ and $E_2$ are 180° out of phase with each other and both exceed the D.C. voltage of the battery 92. A transistor 87, whose elements are designated by their corresponding initials, has its base and collector connected to the terminals 84 and 86, respectively. The emitter is connected to a junction point 91 which is further connected to the positive terminal of the D.C. storage battery 92. The negative battery terminal is connected to the terminal 85. The junction point 91 forms the center point of a full-wave rectifier, which consists of a pair of diode rectifier elements 93 and 94 connected between it and the terminals 84 and 86, respectively. The inductive winding 83 is shunted by its self-capacitance which effectively appears between the terminals 84 and 86. If desired, condenser 95 may be additionally connected across the terminals 84 and 86.

While the normal A.C. power source is operative, the operation of the circuit of FIG. 9 is similar to that described in connection with the circuit of FIG. 6. The application of the voltages $E_1$ and $E_2$ maintains the transistor 87 in the cut-off state and prevents the battery 92 from supplying D.C. power. During this time, the full-wave rectifier supplies a charging current to the D.C. storage battery. In the event of failure of the normal A.C. power source $E_{AC}$, the transistor 87 becomes conductive and emergency power is supplied from the D.C. storage battery 92. The circuit parameters are so chosen that the inductance of the transformer secondary 83 and the capacitance of condenser 95 (which also represents the self-capacitance of the winding 83) form a resonant circuit. As a result, oscillations occur which are sustained by the power derived from the battery. These oscillations appear across the winding 83 whence they are applied across the load 80 as the result of the action of transformer 81. As a consequence, the load 80 is excited with A.C., power upon the failure of the external source $E_{AC}$. As long as the oscillations which are sustained by the power drawn from the D.C. source continue, the load 80 is effectively coupled into the resonant circuit. Accordingly, the apparatus of FIG. 9 acts as a D.C. to A.C. power converter to energize the load with emergency A.C. power in the event of failure of the normal A.C. power source. When the latter is again operative, the transistor 87 resumes its cut-off state and the converter action ceases.

As previously explained, the presence of the condenser 95 is not required where the self-capacity, i.e., the capacity between successive loops of the winding 83, is sufficient to cause oscillations in cooperation with the inductance of winding 83. The advantage of using the condenser 95 is the ability to control the frequency of the oscillations and to generate sine waves. Alternatively, the transformer core may be allowed to saturate, in which case semi-square waves will result.

Figure 10:
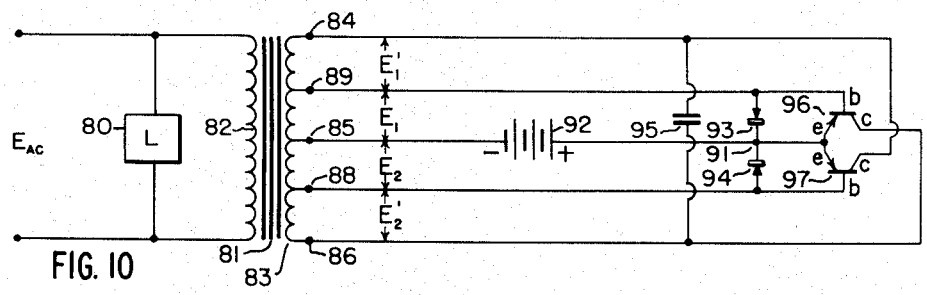
FIG. 10 illustrates an embodiment of the invention which employs a push-pull oscillator as a converter for supplying A.C. emergency power to the load.

FIG. 10 illustrates another embodiment of the invention wherein emergency A.C. power is supplied to the load upon the failure of the normal A.C. power source. Wherever possible, the applicable reference numerals of FIG. 9 have been retained. In the embodiments of FIG. 10, a pair of transistors 96 and 97 are connected in push-pull relationship, the transistor collectors being connected through the transformer secondary terminals 86 and 84 respectively. The transistor emitters are tied together and connected to a junction 91. Intermediate transformer secondary terminals 88 and 89 are respectively connected between the terminals 84 and 86 and a terminal 85, which need not necessarily be a center tap. The respective bases of transistors 96 and 97 are connected to the taps 89 and 88 respectively. A full-wave rectifier consisting of a pair of oppositely-poled diode rectifier elements 93 and 94 are connected between the junction point 91 and the terminals 88 and 89 respectively. A condenser 95 is connected across the transformer terminals 84 and 86.

As long as the source $E_{AC}$ is operative, the voltages derived at the respective transformer secondary terminals (excepting terminal 85) exceed the D.C. voltage of the storage battery 92. As in the case of FIG. 9, the full-wave rectifier serves to keep the storage battery 92 charged as long as the source $E_{AC}$ is operative. When a positive voltage $E_1$ appears on the terminal 89 the emitter-base circuit of transistor 96 is cut off and no current can flow in the emitter-collector circuit of the same transistor, even though the negative voltage $-(E_2+E_2')$ which simultaneously appears on tap 86 is applied to the collector of transistor 96. During the next half cycle, the voltage $E_1$ which is applied to the base of transistor 96 is negative. However, no current can flow in the emitter-collector circuit of the transistor 96 because a positive voltage $E_2+E_2'$ is simultaneously applied to the collector. A similar situation, although 180° out of phase, obtains with respect to transistor 97.

When the source $E_{AC}$ fails, the applied voltage of the storage battery 92 would ordinarily render both transistors conductive. However, the resonant circuit determined by the capacity of condenser 95 and the inductance of the secondary transformer winding 83, produces oscillations which cause the transistors 96 and 97 to conduct alternately in push-pull relationship. These oscillations which are sustained as a result of the energy supplied by the battery are applied to the load 80 by means of transformer action. As in the case of FIG. 9, the reflected impedance of the load effectively appears in series with the inductance of the transformer winding 83 and thus serves to limit the amplitude of the oscillations. Where a more rapid battery charging rate is desired, the rectifier elements 93 and 94 of FIG. 10 may be connected between junction point 91 and terminals 84 and 86 respectively in order to apply a higher charging voltage to the battery.

Figure 11:
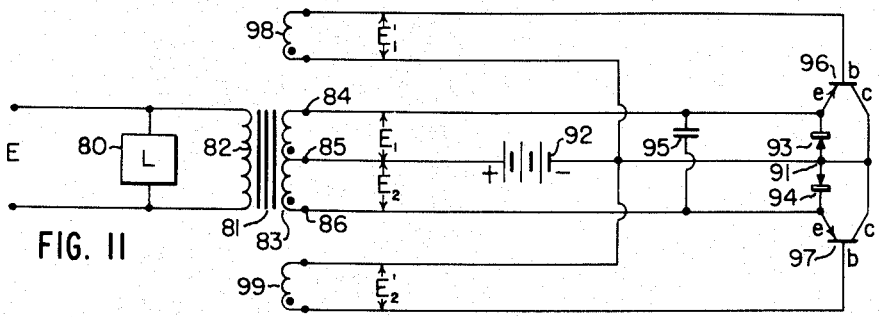
FIG. 11 illustrates an A.C. emergency power supply wherein the collectors of the push-pull connected transistors are tied together.

FIG. 11 illustrates a further embodiment of the invention wherein emergency A.C. power is again supplied to a load in the event of failure of the normal A.C. power source. Applicable reference numerals have been retained. In this circuit, both the condenser 95 and the full-wave rectifier are connected across the transformer secondary terminals 84 and 86. The emitters of transistors 96 and 97 are respectively connected to the intermediate transformer terminals 86 and 84 so as to be energized with the voltages $E_1$ and $E_2$ respectively. The transistor collectors are both connected to the junction point 91 which in turn is coupled to the negative terminal of the storage battery 92. The transformer secondary further comprises a pair of windings 98 and 99 which are poled as indicated by the dot notation in the drawing. The voltages $E_1'$ and $E_2'$ appear across these windings. The winding 98 is connected between the base and the collector of the transistor 96 while the winding 99 is connected between the base and the collector of the transistor 97. It will be readily seen that the base and the collector of each transistor are out of phase with each other as long as A.C. voltages are applied. Thus, regardless of the voltage applied to the collector of each transistor, its emitter-collector circuit is cut off. Upon the failure of the normal power source $E_{AC}$, the storage battery 92 applies a negative D.C. voltage to the collector of each transistor. A similar D.C. negative voltage is applied to the base of each transistor through the D.C. conductive windings 98 and 99 respectively.

The inductance and the secondary winding 83 together with the capacitance 95 produce oscillations. The feedback voltages applied to the respective transistors by the supplemental windings 98 and 99 provide for a push-pull operation of the transistors. The oscillations are applied to the load 80 by transformer action, the amplitude of oscillation being limited by the reflected load impedance in the resonant circuit.

Figure 12:
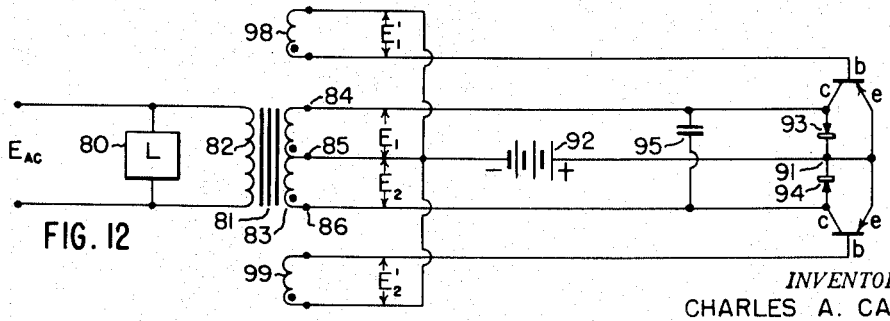
FIG. 12 illustrates a modification of the embodiment of FIG. 11 wherein the emitters of the push-pull connected transistors are tied together.

In FIG. 12, which is a modification of the circuit of FIG. 11, the respective transistor emitters are tied together. The voltages $E_1$ and $E_2$ respectively are applied between the tap 85 and the collectors of the two transistors, while the voltages $E_1'$ and $E_2'$ respectively are applied between the tap 85 and the bases of the transistors. As long as the normal A.C. power source $E_{AC}$ operates, the transistors remain cut off. A push-pull transistor operation results when the normal A.C. power source fails. In this case again, power derived from the D.C. source is applied to the load 80 in the form of emergency A.C. power.

As previously explained, many modifications and substitutions may be carried out in the various embodiments of the invention. For example, the secondary resonating capacitance 95 in each of the circuits of FIGS. 9-12, may be omitted if operation with semi-square wave output is acceptable. In this case, the transformer core is permitted to saturate on each half cycle of the oscillations, the resultant frequency being a function of the battery voltage and of the transformer magnetic core materials.

Either npn junction transistors or pnp junction transistors may be used, as long as the proper power source and rectifier polarities are observed. Similarly, pnpn or "tetrode" transistors may be used herein. It will be readily understood that the oppositely phased A.C. voltages may be obtained in numerous different ways from the normal A.C. power source. For example, the required A.C. voltages could be derived from an autotransformer suitably energized by the voltage $E_{AC}$.

Depending on the function which is to be carried out by the emergency power supply herein, the load may be identical with that energized from the normal A.C. power source, or may assume any desired form. For example, where the purpose of the emergency power supply is to provide illumination automatically upon the failure of A.C. power, the load may consist of a lamp. Alternatively, the load may consist of a warning buzzer or of a starting motor to re-start the operation of certain machinery whose continued operation is vital. The load may further consist of a power relay or the like which actuates another power supply. In the latter case, the function of the battery is only to supply the proper transistor bias upon the failure of A.C. power.

In view of the foregoing description and illustration of the invention, it will be apparent that numerous modifications and departures may now be made by those skilled in the art, all of which fall within the true spirit and scope contemplated by the invention.

I claim:

1. Apparatus for supplying D.C. power to a load upon the failure of A.C. power, comprising a transistor having an emitter, a base and a collector, a pair of terminals adapted to be energized with D.C. power, one of said terminals being connected to said emitter, means for applying a first A.C. voltage intermediate the other one of said terminals and said base, and an emitter-collector circuit, said circuit including said pair of terminals, means for producing a second A.C. voltage in phase opposition to said first voltage, and means adapted to be coupled to a load, said A.C. voltages being adapted to prevent substantially all current flow in said emitter-collector circuit, and said last-recited circuit being adapted to be energized with D.C. power in the absence of said A.C. voltages.

2. An automatic emergency power supply comprising at least one transistor having an emitter, a base and a collector, an emitter-base circuit including in series a pair of terminals adapted to have D.C. applied thereto at a predetermined D.C. potential, and means for producing a first A.C. voltage, said A.C. voltage having an amplitude at least equal to said D.C. potential, an emitter-collector circuit including in series said pair of terminals and means adapted to be coupled to a load, a pair of oppositely poled rectifiers connected to said emitter, means for applying at least a portion of said first A.C. voltage to one of said rectifiers and to said emitter-base circuit, means for applying a second A.C. voltage to the other of said rectifiers and to said emitter-collector circuit, said second A.C. voltage being opposite in phase to said first A.C. voltage, said A.C. voltages being adapted to prevent substantially all current flow in said emitter-collector circuit, and said last-recited circuit being adapted to be energized with D.C. power in the absence of said A.C. voltages.

3. Apparatus for automatically supplying D.C. power to a load upon the failure of A.C. power, comprising a transistor having a control circuit including in series a pair of terminals, means for applying D.C. power to said terminals at a predetermined D.C. potential, a resistive impedance effectively connected in series with said control circuit, means for applying a first A.C. voltage intermediate one of said pair of terminals and said impedance, the amplitude of said first A.C. voltage being at least equal to said D.C. potential, a load circuit including in series said pair of terminals, means for applying a second A.C. voltage to said load circuit, the amplitude of said second A.C. voltage being at least equal to said D.C. potential and being in phase opposition to said first A.C. voltage, and means for coupling a load into said load circuit, said A.C. voltages being adapted to prevent substantially all current flow in said load, said load being adapted to be energized with direct current in the absence of said A.C. voltages.

4. The apparatus of claim 3 wherein said means for applying said first and second voltages comprise the secondary of a transformer, said transformer secondary including a tap connected to said one terminal, the transformer primary being adapted to have an A.C. voltage applied thereto.

5. Apparatus for automatically supplying D.C. power to a load upon the failure of A.C. power, comprising first and second transistors, each of said transistors having an emitter, a base and a collector, means for applying power at a predetermined D.C. potential between a first terminal and the emitter of said first transistor, means for applying a first A.C. voltage between said first terminal and a third terminal, the amplitude of said A.C. voltage being at least equal to said D.C. potential, means for coupling said third terminal to the base of said second transistor, the base of said first transistor being connected to the emitter of said second transistor, means for coupling a load between said first terminal and the collector of said first transistor, means for applying a second A.C. voltage between said first terminal and a fourth terminal, the amplitude of said second A.C. voltage being at least equal to said D.C. potential and being in phase opposition with said first A.C. voltage, means for providing a D.C. connection between the collector of said second transistor and said first terminal, a pair of oppositely poled rectifiers connected to said emitter, means for applying at least a portion of said first and second voltages respectively to said rectifiers, said A.C. voltages being adapted to prevent substantially all current flow between the emitter and collector of said first transistor, said load being adapted to be energized with D.C. power in the absence of said A.C. voltages.

6. An automatic emergency power supply comprising a transformer having a primary winding and at least one secondary winding, a load connected to said primary winding, means for energizing said load and said primary winding from a normal A.C. power source, a secondary winding circuit including at least one transistor having an emitter, a base and a collector, said secondary winding circuit further including means for applying normal A.C. voltages between the emitter and base and between the emitter and collector respectively of said transistor, said normal A.C. voltages being adapted to maintain said transistor in a cut-off condition, a D.C. emergency power source adapted to render said transistor conductive in the absence of said normal A.C. voltages, an oscillating circuit including said secondary winding, said oscillating circuit further including the reflected impedance of said load and being adapted to sustain oscillations energized from said D.C. source, said oscillations being operative to transmit emergency A.C. power to said load upon the failure of said normal A.C. power source.

7. An automatic emergency supply comprising a transformer having primary and secondary windings, a load connected to said primary winding, means for energizing said load and said primary winding from a normal A.C. power source, said secondary winding including first and second end terminals, a third terminal disposed between said first and second end terminals, first and second intermediate terminals disposed between said third terminal and said first and second end terminals respectively, first and second transistors each having an emitter, a base and a collector, said first and second transistor bases being connected to said first and second intermediate terminals respectively, said first and second transistor collectors being connected to said second and first end terminals respectively, respective transistor emitters being connected to a common junction point, a D.C. storage battery connected between said common junction and said third terminal, a pair of oppositely poled diode rectifiers connected between said common junction point and one of said terminal pairs, an oscillating circuit including said secondary winding, said D.C. storage battery being adapted upon the failure of said normal A.C. power source to render said transistors alternately conductive at a frequency determined by said oscillating circuit, the resultant oscillations being adapted to transmit emergency A.C. power to said load by means of said transformer.

8. An automatic emergency power supply comprising a transformer having a primary winding, a main secondary winding and a pair of supplemental secondary windings, a load connected to said primary winding, means for energizing said load and said primary winding from a normal A.C. power source, a pair of transistors each including an emitter, a base and a collector, the base and collector of each of said transistors being connected across one of said supplemental windings, said collectors being tied to a common junction point, said main secondary winding including first and second end terminals and a third terminal disposed therebetween, each of said emitters being connected to one of said end terminals, a pair of oppositely poled diode rectifiers connected between said common junction point and respective ones of said end terminals, a D.C. storage battery connected between said common junction point and said third terminal, an oscillating circuit including said secondary windings, said D.C. storage battery being adapted upon the failure of said normal A.C. power source to render said transistors alternately conductive at a frequency determined by said oscillating circuit, the resultant oscillations being adapted to transmit emergency A.C. power to said load by means of said transformer.

9. Apparatus for supplying emergency power from a D.C. source to a load upon the failure of a normal A.C. source, said apparatus including a transistor having a control circuit and a load circuit, said D.C. source being connected in common with said control and load circuits to energize said load, and means to apply to the respective control and load circuits of said transistor voltages of opposite phase derived from said A.C. source to maintain said load deenergized until a failure of said A.C. source occurs.

10. Apparatus for supplying emergency power from a D.C. source to a load upon the failure of a normal A.C. source, said apparatus comprising an oscillator powered by said D.C. source, said oscillator including a transistor having a control circuit and a load circuit to energize said load, and a transformer having a primary winding coupled to said A.C. source and at least a pair of secondary windings of opposite sense coupled to the respective control and load circuits of said transistor to maintain said load deenergized until a failure of said A.C. source occurs.

References Cited in the file of this patent

UNITED STATES PATENTS

| | | |
|---|---|---|
| 1,953,602 | Hanley | Apr. 3, 1934 |
| 2,062,275 | Rees | Nov. 4, 1936 |